(12) United States Patent
Casper et al.

(10) Patent No.: US 8,657,023 B2
(45) Date of Patent: Feb. 25, 2014

(54) MULTIPLE-SECTION AGRICULTURAL IMPLEMENT

(75) Inventors: Robert T. Casper, Ankeny, IA (US);
Shawn J. Becker, Ankeny, IA (US);
Jarrod R. Ruckle, Bondurant, IA (US);
Ricky B. Theilen, Altoona, IA (US);
John O. Rumohr, Pleasant Hill, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/528,030

(22) Filed: Jun. 20, 2012

(65) Prior Publication Data

US 2013/0341056 A1 Dec. 26, 2013

(51) Int. Cl.
*A01B 63/111* (2006.01)
*A01B 49/02* (2006.01)

(52) U.S. Cl.
USPC ................................ 172/4; 172/145

(58) Field of Classification Search
USPC ............. 172/4, 140, 145–151, 468, 471, 472, 172/613, 619, 662, 776
See application file for complete search history.

(56) References Cited

U.S. PATENT DOCUMENTS

| | | | | |
|---|---|---|---|---|
| 4,176,721 A | * | 12/1979 | Poggemiller et al. | 172/4 |
| 4,213,503 A | * | 7/1980 | Elmberg et al. | 172/4.5 |
| 4,355,688 A | | 10/1982 | Hamm et al. | |
| 4,444,271 A | * | 4/1984 | Dietrich, Sr. | 172/140 |
| 4,446,924 A | * | 5/1984 | Dietrich, Sr. | 172/140 |
| 4,600,060 A | | 7/1986 | Winter et al. | |
| 4,625,809 A | | 12/1986 | Moynihan | |
| 4,646,620 A | * | 3/1987 | Buchl | 91/1 |
| 5,113,957 A | * | 5/1992 | Tamai et al. | 172/10 |
| 5,156,216 A | * | 10/1992 | Van Mill | 172/138 |
| 5,161,622 A | * | 11/1992 | Godbersen | 172/140 |
| 5,261,495 A | * | 11/1993 | Szymczak | 172/2 |
| 5,427,184 A | | 6/1995 | Peck | |
| 5,590,721 A | * | 1/1997 | Van Mill | 172/138 |
| 5,622,227 A | * | 4/1997 | McDonald | 172/146 |
| 5,653,292 A | * | 8/1997 | Ptacek et al. | 172/4 |
| 5,957,218 A | | 9/1999 | Noonan et al. | |
| 5,988,293 A | | 11/1999 | Brueggen et al. | |

(Continued)

FOREIGN PATENT DOCUMENTS

| | | |
|---|---|---|
| FR | 2568088 | 1/1986 |
| NL | 9100032 | 8/1992 |

OTHER PUBLICATIONS

European Search Report for related European Application No. 13172416.3, dated Sep. 30, 2013.

*Primary Examiner* — Matthew D Troutman
(74) *Attorney, Agent, or Firm* — Quarles & Brady LLP

(57) ABSTRACT

A self-compensating multiple-section agricultural implement is disclosed. The agricultural implement includes a first ground-engaging tool coupled to a first frame section. A lift device in fluid communication with a hydraulic controller is coupled to the first frame section. The lift device is configured for raising and lowering the first frame section to move the first ground-engaging tool between a first ground-engaging tool transport position and a first pre-selected operating depth. A second frame section is coupled to the first frame section forward of the first ground-engaging tool. A second ground-engaging tool is coupled to the second frame section. An extendable and retractable cylinder is in fluid communication with the hydraulic controller and is coupled to the first frame section and the second frame section. The extendable and retractable cylinder is configured to move the second ground-engaging tool between a second ground-engaging tool transport position and a second pre-selected operating depth.

20 Claims, 9 Drawing Sheets

(56) References Cited

U.S. PATENT DOCUMENTS

| | | | |
|---|---|---|---|
| 6,068,064 A | 5/2000 | Bettin et al. | |
| 6,076,611 A * | 6/2000 | Rozendaal et al. | 172/4 |
| 6,164,385 A * | 12/2000 | Buchl | 172/239 |
| 6,276,462 B1 * | 8/2001 | Dietrich, Sr. | 172/138 |
| 6,698,523 B2 | 3/2004 | Barber | |
| 6,786,130 B2 | 9/2004 | Steinlage et al. | |
| 7,017,675 B2 * | 3/2006 | Ankenman et al. | 172/146 |
| 7,478,683 B2 | 1/2009 | Peck et al. | |
| 8,006,775 B2 * | 8/2011 | Steinlage et al. | 172/151 |
| 8,016,044 B2 * | 9/2011 | Kromminga et al. | 172/178 |
| 8,047,299 B2 * | 11/2011 | Hurtis et al. | 172/146 |
| 8,255,126 B2 * | 8/2012 | Hunt et al. | 701/50 |
| 2002/0043374 A1 * | 4/2002 | Luca et al. | 172/4 |
| 2003/0015327 A1 * | 1/2003 | Cox et al. | 172/452 |
| 2003/0085044 A1 * | 5/2003 | McFarlane | 172/146 |
| 2003/0127235 A1 * | 7/2003 | Dannigkeit | 172/2 |
| 2003/0196823 A1 * | 10/2003 | McDonald | 172/146 |
| 2004/0016554 A1 * | 1/2004 | McDonald | 172/146 |
| 2004/0149459 A1 * | 8/2004 | Powell et al. | 172/145 |
| 2006/0021768 A1 * | 2/2006 | Ankenman | 172/146 |
| 2011/0100653 A1 * | 5/2011 | Kromminga et al. | 172/145 |
| 2011/0231069 A1 | 9/2011 | Ryder et al. | |

* cited by examiner

MULTIPLE-SECTION AGRICULTURAL IMPLEMENT

FIELD OF THE DISCLOSURE

The present disclosure generally relates to agricultural implements and more particularly to a multiple-section agricultural implement including self-compensating depth control.

BACKGROUND OF THE DISCLOSURE

In order to provide depth control for multiple-section agricultural implements, implements commonly include an electro-hydraulic control system. The control system is typically used to adjust depth of a single ground-engaging tool (e.g., disk gang assembly) or a frame section (e.g., wing) across a width of the implement, transverse to a direction of travel. For example, John Deere's AccuDepth™ provides depth control across the width of the implement but not fore-to-aft in the direction of travel.

The frame sections are pivotally coupled to one another at a pivot location so that the agricultural implement can more closely follow the contour of the ground and yet fold for transport across a width of the implement, transverse to a direction of travel. The frame sections support a plurality of ground-engaging tools, which are drawn through the soil.

SUMMARY OF THE DISCLOSURE

In one embodiment, an agricultural implement is disclosed. The agricultural implement is adapted to be moved by a vehicle in a forward direction of travel. The agricultural implement includes a first frame section. A first ground-engaging tool is coupled to the first frame section. A lift device in fluid communication with an electro-hydraulic controller is coupled to the first frame section. The electro-hydraulic controller is configured to receive a source of hydraulic pressure. The lift device is configured for raising and lowering the first frame section with respect to the ground to move the first ground-engaging tool between a first ground-engaging tool transport position and a first pre-selected operating depth. A second frame section is coupled to the first frame section forward of the first ground-engaging tool. A second ground-engaging tool is coupled to the second frame section. An extendable and retractable cylinder is in fluid communication with the electro-hydraulic controller and is coupled to the first frame section and the second frame section. The extendable and retractable cylinder is configured to move the second ground-engaging tool between a second ground-engaging tool transport position and a second pre-selected operating depth.

In another embodiment, an agricultural implement is disclosed. The agricultural implement is adapted to be moved by a vehicle in a forward direction of travel. The agricultural implement includes a first frame section. A first ground-engaging tool is coupled to the first frame section and is configured to operate at a first pre-selected operating depth. A second frame section is coupled to the first frame section forward of the first ground-engaging tool. A second ground-engaging tool is coupled to the second frame section. A first extendable and retractable cylinder is in fluid communication with an electro-hydraulic controller that is configured to receive a source of hydraulic pressure. The first extendable and retractable cylinder is coupled to the first frame section and the second frame section and is configured to move the second ground-engaging tool between a second ground-engaging tool transport position and a second pre-selected operating depth. A third frame section is coupled to the first frame section rearward of the first ground-engaging tool. A third ground-engaging tool is coupled to the third frame section. A second extendable and retractable cylinder is in fluid communication with the electro-hydraulic controller and is coupled to the first frame section and the third frame section. The second extendable and retractable cylinder is configured to move the third ground-engaging tool between a third ground-engaging tool transport position and a third pre-selected operating depth.

In yet another embodiment, an agricultural implement is disclosed. The agricultural implement is adapted to be moved by a vehicle in a forward direction of travel. The agricultural implement includes a first frame section. A first ground-engaging tool is coupled to the first frame section. A lift device is in communication with an electronic controller that is configured to receive a source of electric power. The lift device is coupled to the first frame section and configured for raising and lowering the first frame section with respect to the ground to move the first ground-engaging tool between a first ground-engaging tool transport position and a first pre-selected operating depth. A second frame section is coupled to the first frame section forward of the first ground-engaging tool. A second ground-engaging tool is coupled to the second frame section. An electronic actuator is in communication with the electronic controller and is coupled to the first frame section and the second frame section. The electronic actuator is configured to move the second ground-engaging tool between a second ground-engaging tool transport position and a second pre-selected operating depth.

Other features and aspects will become apparent by consideration of the detailed description and accompanying drawings.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

DETAILED DESCRIPTION

Figure 1:
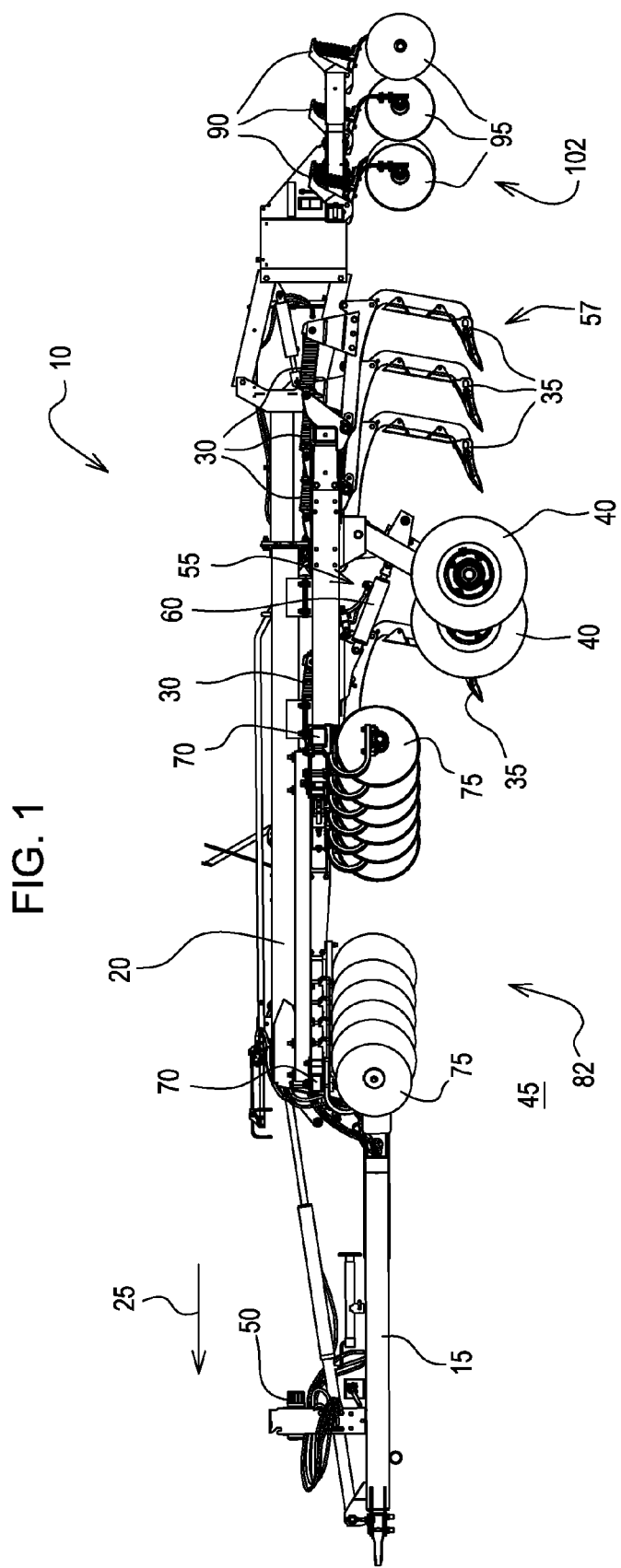
FIG. 1 is a side view of an agricultural implement in a transport position according to one embodiment.

FIG. 1 illustrates an agricultural implement 10 according to one embodiment. The illustrated agricultural implement 10 includes a coupling mechanism 15 for coupling to a vehicle (not shown).

A first frame section 20 is coupled to the coupling mechanism 15. The first frame section 20 extends rearwardly from the coupling mechanism 15 in a direction opposite of a direction of travel 25. A first ground-engaging tool 30 is coupled to the first frame section 20. The illustrated first ground-engaging tool 30 is a shank 35. Other ground-engaging tools (e.g., disks) are contemplated by this disclosure. A plurality of wheel assemblies 40 are coupled to the first frame section 20 to support the first frame section 20 above ground 45.

Illustratively, a controller 50 (e.g., electro-hydraulic) is coupled to the coupling mechanism 15. Alternatively, other coupling locations are contemplated by this disclosure. In the illustration shown, the controller 50 is configured to receive a source of hydraulic pressure (not shown).

Figure 2:
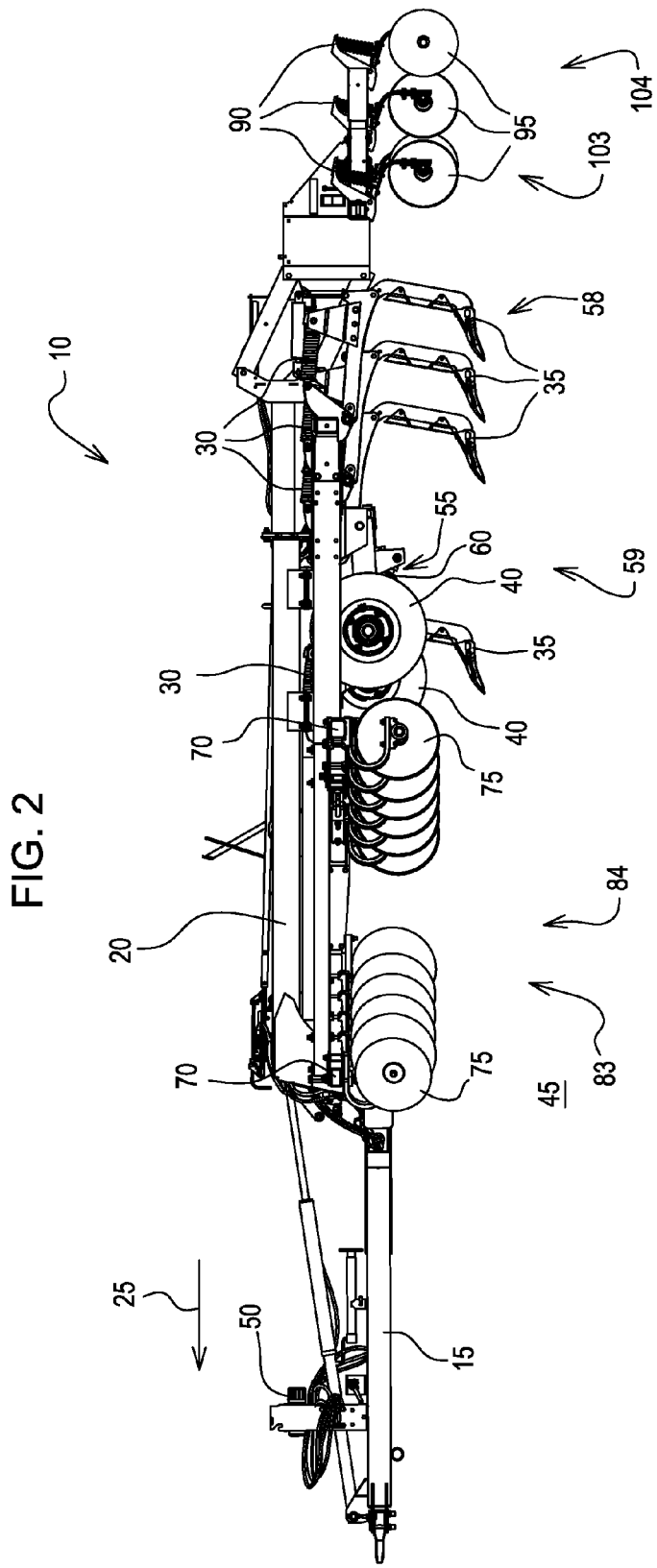
FIG. 2 is a side view of the agricultural implement of FIG. 1 in an operating position.

A lift device 55 (e.g., hydraulic cylinder) is coupled to the first frame section 20 and to the wheel assemblies 40. The lift device 55 is in fluid communication with the controller 50 and configured for raising and lowering the first frame section 20 relative to the ground 45 to move the first ground-engaging tool 30 between a first ground-engaging tool transport position 57 and a first pre-selected operating depth 58 (FIG. 2). With reference to FIGS. 1 and 2, preferably, the first ground-engaging tool 30 can move up to sixteen inches when moving from the first ground-engaging tool transport position to the first pre-selected operating depth. Other first ground-engaging tool 30 movement distances are contemplated by this disclosure. The illustrated lift device 55 is a lift device hydraulic cylinder 60. Alternatively, the lift device 55 may be coupled to the first frame section 20 and the first ground-engaging tool 30 to move the first ground-engaging tool 30 relative to the ground 45.

Figure 3:
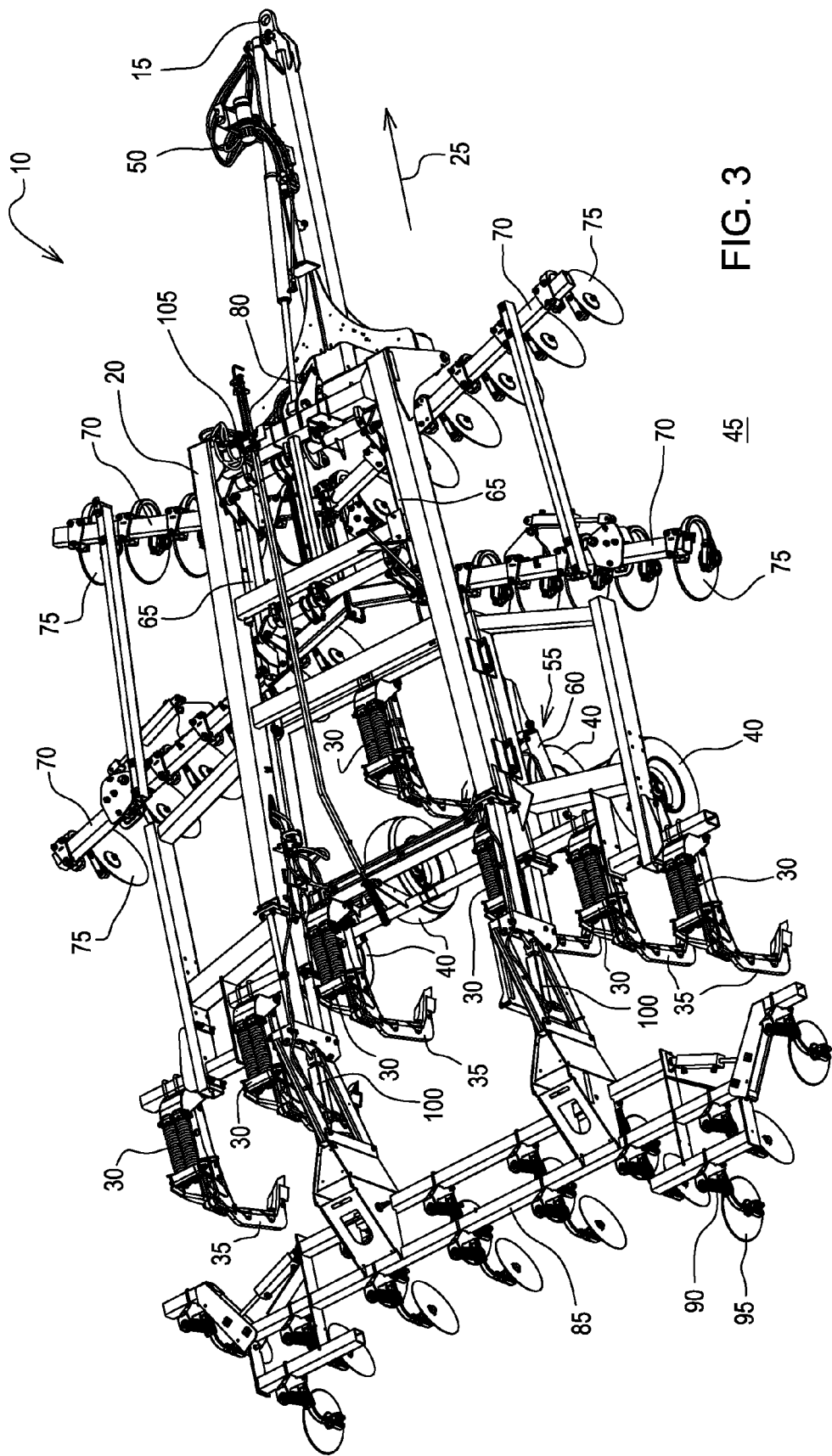
FIG. 3 is a perspective view of the agricultural implement of FIG. 1.

With reference to FIG. 3, a second frame section 65 is pivotally coupled to the first frame section 20 forward of the first ground-engaging tool 30. A second ground-engaging tool 70 is coupled to the second frame section 65. The illustrated second ground-engaging tool 70 is a disk gang assembly 75. Other ground-engaging tools (e.g., rippers) are contemplated by this disclosure.

Figure 4:
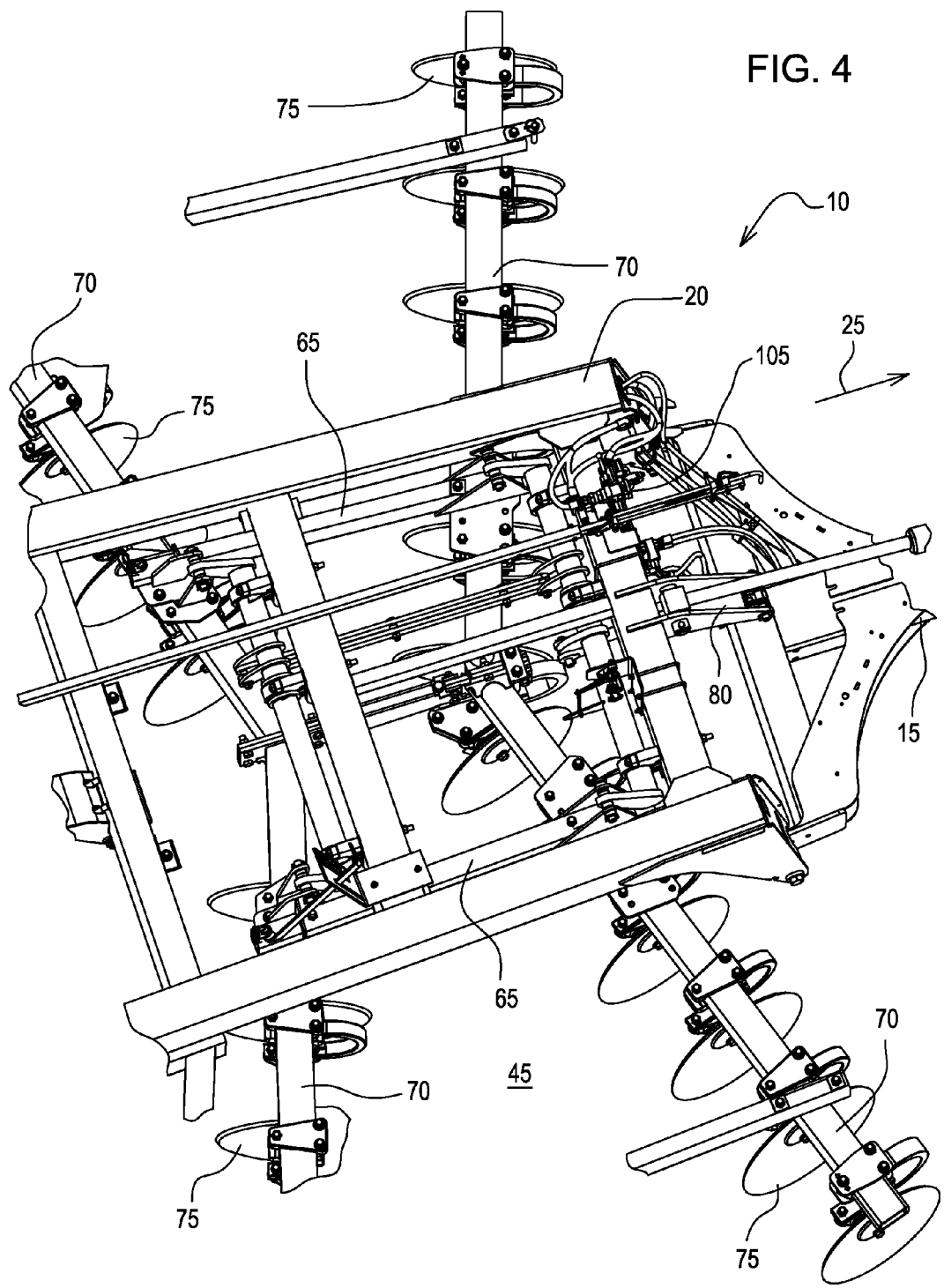
FIG. 4 is a perspective view of a portion of the agricultural implement of FIG. 1.

With reference to FIG. 4, a first extendable and retractable cylinder 80 (e.g., hydraulic) is coupled to the first frame section 20 and the second frame section 65. The illustrated first extendable and retractable cylinder 80 is in fluid communication with the controller 50 (FIG. 1) and configured to move the second ground-engaging tool 70 between a second ground-engaging tool transport position 82 (FIG. 1) and a second pre-selected operating depth 83 (FIG. 2) by moving the second frame section 65 relative to the first frame section 20. Preferably, the second ground-engaging tool 70 can move up to eight inches from the first frame section 20 when moving from the first ground-engaging tool transport position 82 to the first pre-selected operating depth 83. Other second ground-engaging tool 70 movement distances are contemplated by this disclosure. Alternatively, the first extendable and retractable cylinder 80 may be coupled to the second frame section 65 and the second ground-engaging tool 70 to move the second ground-engaging tool 70 relative to the ground 45.

Referring to FIG. 3, illustratively, a third frame section 85 is pivotally coupled to the first frame section 20, rearward of the first ground engaging tool 30. A third ground-engaging tool 90 is coupled to the third frame section 85. The illustrated third ground-engaging tool 90 is a closing disk assembly 95. Other ground-engaging tools (e.g., rippers) are contemplated by this disclosure.

A second extendable and retractable cylinder 100 (e.g., hydraulic) is coupled to the first frame section 20 and the third frame section 85. The illustrated second extendable and retractable cylinder 100 is in fluid communication with the controller 50 and configured to move the third ground-engaging tool 90 between a third ground-engaging tool transport position 102 (FIG. 1) and a third pre-selected operating depth 103 (FIG. 2). Preferably, the third ground-engaging tool 90 can move up to eight inches from the first frame section 20 when moving from the third ground-engaging tool transport position 102 to the third pre-selected operating depth 103. Other third ground-engaging tool 90 movement distances are contemplated by this disclosure. Alternatively, the second extendable and retractable cylinder 100 may be coupled to the third frame section 85 and the third ground-engaging tool 90 to move the third ground-engaging tool 90 relative to the ground 45.

Figure 5:
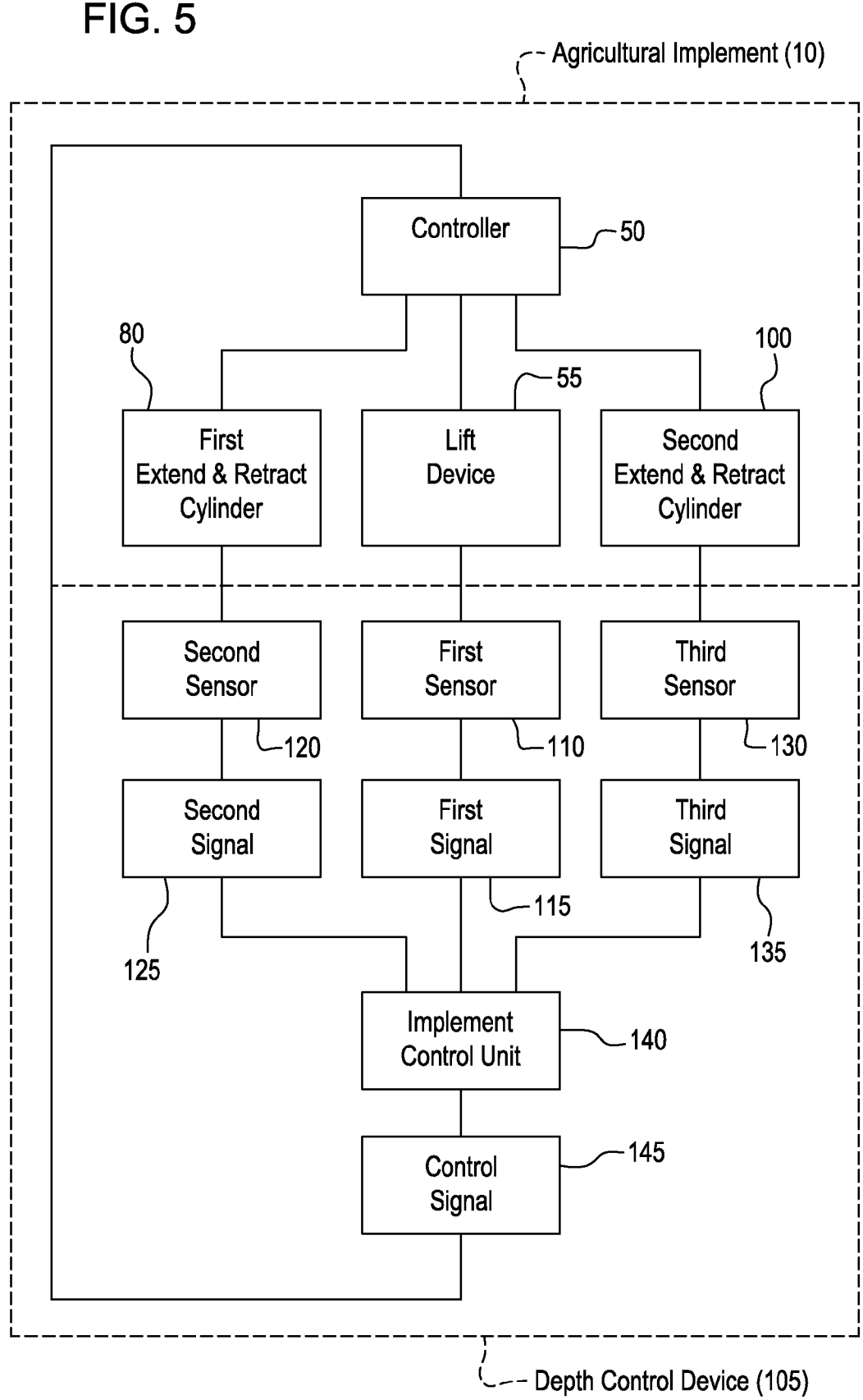
FIG. 5 is a diagrammatic view of the agricultural implement of FIG. 1.

With reference to FIG. 4, a depth control device 105 is coupled to the agricultural implement 10. Illustratively, the depth control device 105 is coupled to the first frame section 20. Other coupling locations are contemplated by this disclosure. Referring to FIG. 5, the depth control device 105 includes a first sensor 110 (e.g., rotational sensor with linkage, potentiometer, pressure transducer) configured to sense an indication (e.g., pressure, relative position, combination of pressure and relative position) of the first pre-selected operating depth 58 and generate a first signal 115. A second sensor 120 (e.g., rotational sensor with linkage, potentiometer, pressure transducer) is configured to sense an indication (e.g., pressure, relative position, combination of pressure and relative position) of the second pre-selected operating depth 83 and generate a second signal 125. A third sensor 130 (e.g., rotational sensor with linkage, potentiometer, pressure transducer) is configured to sense an indication (e.g., pressure, relative position, combination of pressure and relative position) of the third pre-selected operating depth 103 and generate a third signal 135. The first sensor 110, second sensor 120, and third sensor 130 may be at least one of a hall effect rotational sensor that measures relative position and a pressure transducer that measures pressure. Other types of first and second sensors 110, 120 are contemplated by this disclosure.

An implement control unit 140, using open loop, closed loop, or preferably a proportional-integral-derivative "PID" control methodology, is configured to receive the first signal 115, the second signal 125, and the third signal 135 and generate a control signal 145 that is received by the controller 50. The controller 50 adjusts the lift device 55, the first extendable and retractable cylinder 80, and the second extendable and retractable cylinder 100 to maintain a substantially constant (plus or minus one-tenth of an inch) first pre-selected operating depth 58, second pre-selected operating depth 83, and third pre-selected operating depth 103.

In operation, the coupling mechanism 15 of the agricultural implement 10 is adapted to be pulled by the vehicle in the direction of travel 25. The agricultural implement 10 is divided into first, second, and third frame sections fore-to-aft 20, 65, 85 with first, second, and third ground-engaging tools 30, 70, 90 configured to operate at independent first, second, and third pre-selected operating depths 58, 83, 103. The first, second, and third ground-engaging tools 30, 70, 90 can be adjusted on the go via manual or GPS-enabled prescription map input to the implement control unit 140.

As the implement 10 is pulled over ground 45, the implement control unit 140 receives feedback via a first, second, and third signal 115, 125, 135 from a first, second, and third sensor 110, 120, 130 that is an indication of the first, second, and third pre-selected operating depth 58, 83, 103. Using closed loop, open loop, or PID control methodology, the implement control unit 140 iteratively sends control signals 145 to the controller 50 to maintain the desired first, second, and third pre-selected operating depths 58, 83, 103.

The second pre-selected operating depth 83 and the third pre-selected operating depth 103 are independent of the first pre-selected operating depth 58 and independent of each other 83, 103. However, since the second frame section 65 depends from the first frame section 20, the depth control device 105 automatically compensates for movement of the first frame section 20 to maintain a substantially constant second pre-selected operating depth 83. Since the third frame section 85 depends from the first frame section 20, the depth control device 105 automatically compensates for movement of the first frame section 20 to maintain a substantially constant third pre-selected operating depth 103.

FIGS. 6-9 illustrate an agricultural implement 210 according to another embodiment. The agricultural implement 210 includes features similar to the agricultural implement 10 of FIGS. 1-5, and therefore, like components have been given like reference numbers plus 200 and only differences between the agricultural implements 10 and 210 will be discussed in detail below.

Figure 6:
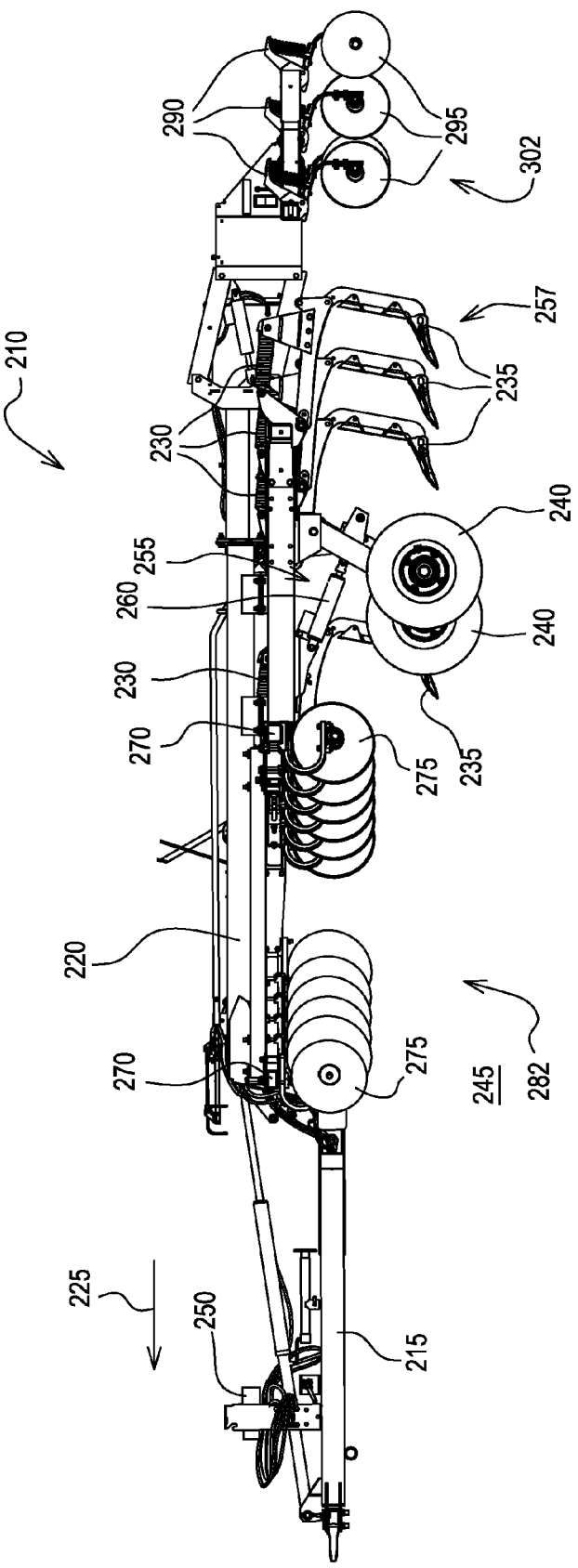
FIG. 6 is a side view of an agricultural implement in a transport position according to another embodiment.
Figure 7:
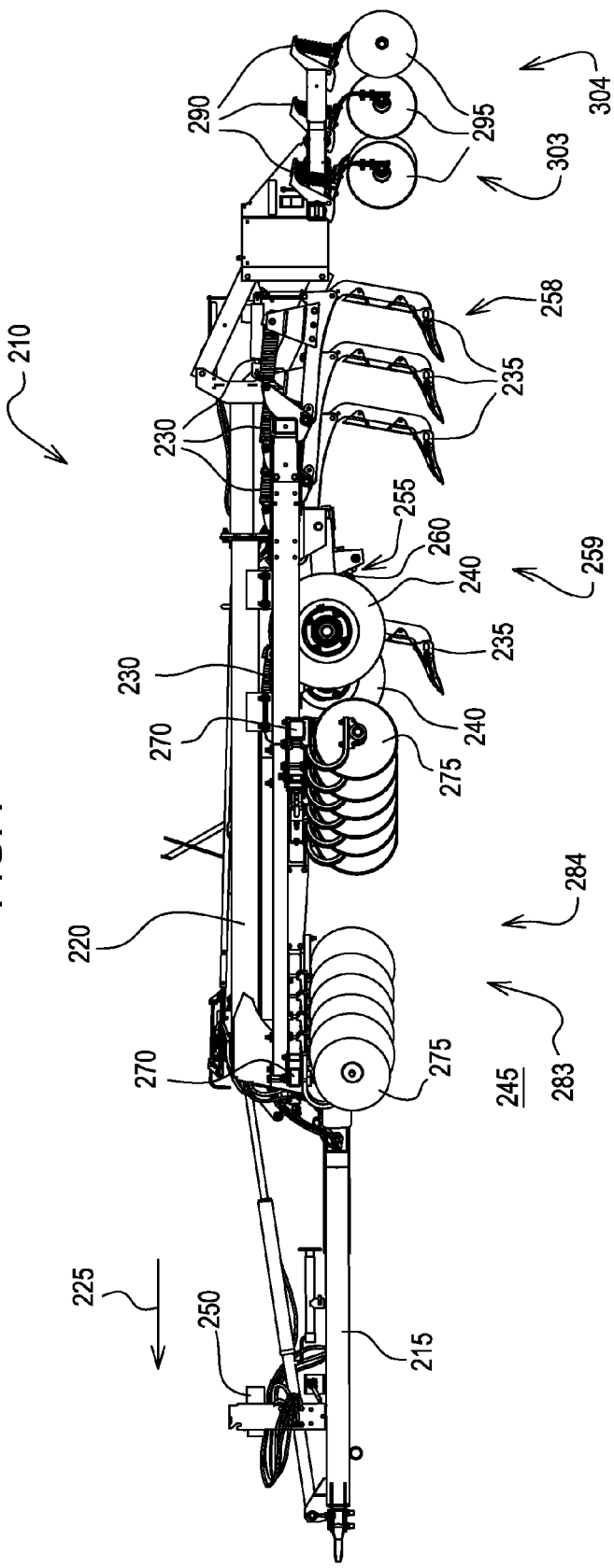
FIG. 7 is a side view of the agricultural implement of FIG. 6 in an operating position.

With reference to FIGS. 6 and 7, illustratively, an electronic controller 250 is coupled to a coupling mechanism 215. Alternatively, other coupling locations are contemplated by this disclosure. In the illustration shown, the electronic controller 250 is configured to receive a source of electrical power (not shown).

A lift device 255 (e.g., electronic linear actuator, electronic rotational actuator) is coupled to the first frame section 220 and to a wheel assembly 240. The lift device 255 is configured for communication with the electronic controller 250 and configured for raising and lowering the first frame section 220 relative to ground 245 to move a first ground-engaging tool 230 between a first ground-engaging tool transport position 257 and a first pre-selected operating depth 258 (FIG. 7). The illustrated lift device 255 is a lift device electronic linear actuator 260.

Figure 8:
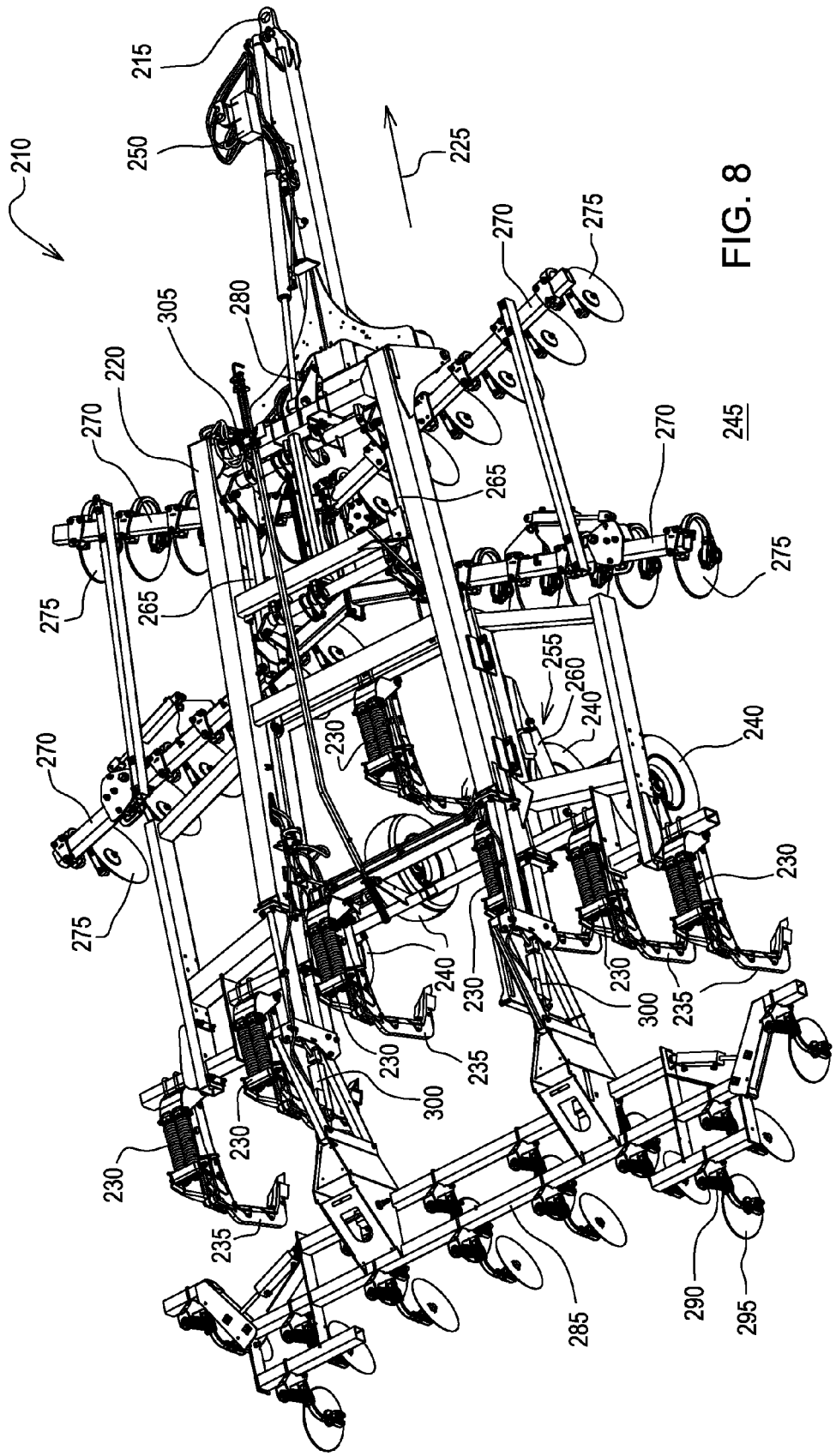
FIG. 8 is a perspective view of the agricultural implement of FIG. 6.

With reference to FIG. 8, a first extendable and retractable actuator 280 (e.g., electronic) is coupled to the first frame section 220 and a second frame section 265. The illustrated first extendable and retractable actuator 280 is configured for communication with the electronic controller 250 and configured to move a second ground-engaging tool 270 between a second ground-engaging tool transport position 282 (FIG. 6) and a second pre-selected operating depth 283 (FIG. 7) by moving the second frame section 265 relative to the first frame section 220. Alternatively, the first extendable and retractable actuator 280 may be coupled to the second frame section 265 and the second ground-engaging tool 270 to move the second ground-engaging tool 270 relative to the ground 245.

A second extendable and retractable actuator 300 (e.g., electronic) is coupled to the first frame section 220 and a third frame section 285. The illustrated second extendable and retractable actuator 300 is configured for communication with the electronic controller 250 and configured to move a third ground-engaging tool 290 between a third ground-engaging tool transport position 302 (FIG. 6) and a third pre-selected operating depth 303 (FIG. 7). Alternatively, the second extendable and retractable actuator 300 may be coupled to the third frame section 285 and the third ground-engaging tool 290 to move the third ground-engaging tool 290 relative to the ground 245.

Figure 9:
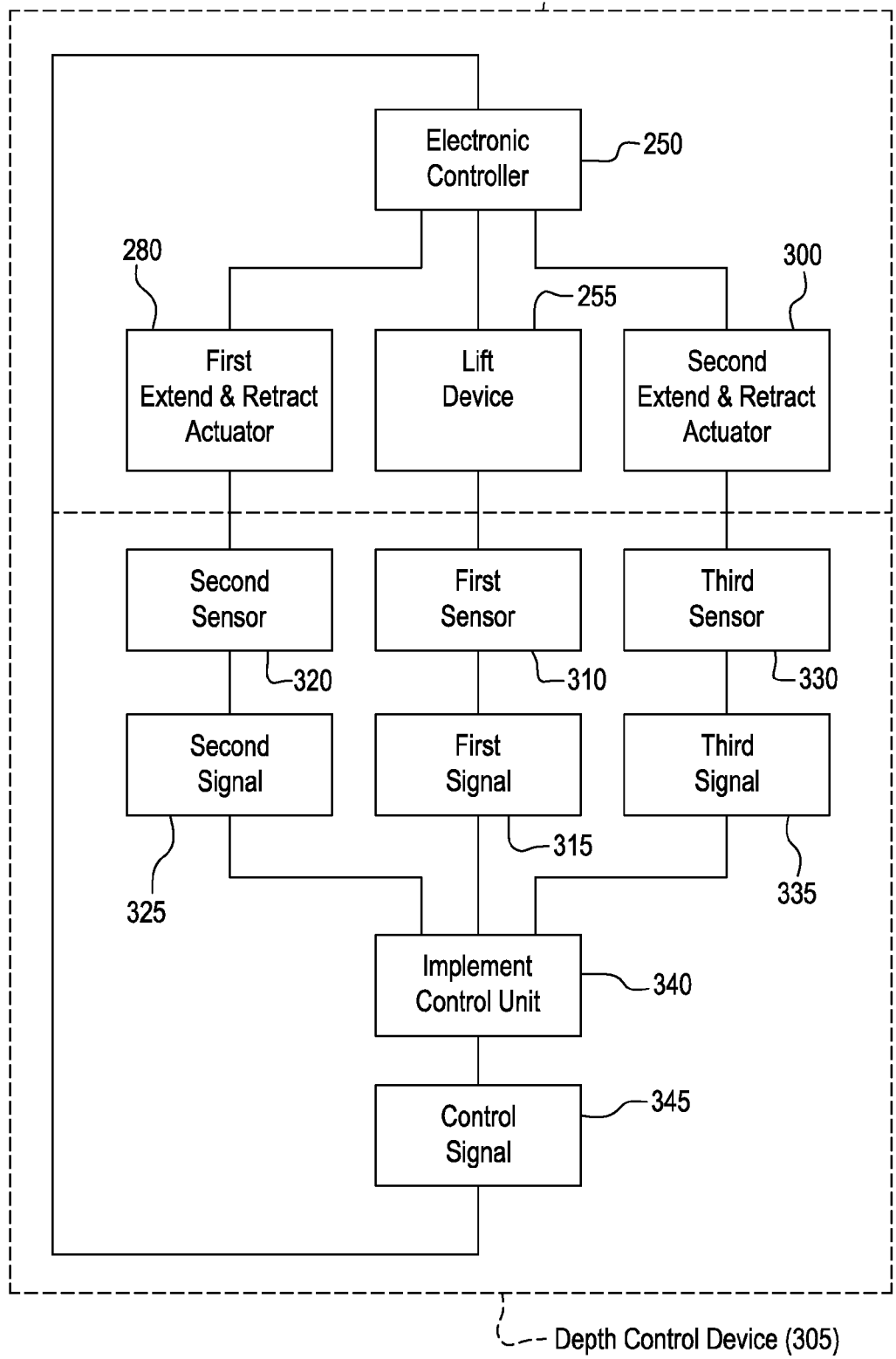
FIG. 9 is a diagrammatic view of the agricultural implement of FIG. 6.

Referring to FIG. 9, an implement control unit 340, using closed loop, open loop, or preferably a PID control methodology, is configured to receive a first signal 315, a second signal 325, and a third signal 335 and generate a control signal 345 that is received by the electronic controller 250. The electronic controller 250 adjusts the lift device 255, the first extendable and retractable actuator 280, and the second extendable and retractable actuator 300 to maintain a substantially constant (plus or minus one-tenth of an inch) first pre-selected operating depth 258 (FIG. 7), second pre-selected operating depth 283, and third pre-selected operating depth 303.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

Various features are set forth in the following claims.

What is claimed is:

1. An agricultural implement adapted to be moved by a vehicle in a forward direction of travel, the agricultural implement comprising:
   a first frame section;
   a first ground-engaging tool coupled to the first frame section;
   an electro-hydraulic controller configured to receive a source of hydraulic pressure;
   a lift device in fluid communication with the electro-hydraulic controller and coupled to the first frame section, the lift device configured for raising and lowering the first frame section with respect to the ground to move the first ground-engaging tool between a first ground-engaging tool transport position and a first pre-selected operating depth;
   a second frame section coupled to the first frame section forward of the first ground-engaging tool, wherein positioning of the second frame section is dependent upon positioning of the first frame section;
   a second ground-engaging tool coupled to the second frame section;
   an extendable and retractable cylinder in fluid communication with the electro-hydraulic controller and coupled to the first frame section and the second frame section, the extendable and retractable cylinder configured to move the second ground-engaging tool between a second ground-engaging tool transport position and a second pre-selected operating depth; and
   a depth control device having at least one sensor configured to sense an operating depth of the second ground-engaging tool, the at least one sensor being operatively coupled to the electro-hydraulic controller, wherein the electro-hydraulic controller receives from the depth control device an input signal based on a signal from the at least one sensor and controls at least one of the lift device and the extendable and retractable cylinder to compensate for movement of the first frame section as needed to maintain the second ground-engaging tool substantially at the second pre-selected operating depth.

2. The agricultural implement of claim 1, wherein the depth control device has two or more sensors including a first sensor configured to sense an operating depth of the first ground-engaging tool and being operatively coupled to the electro-hydraulic controller which controls the lift device to maintain the first ground-engaging tool substantially at the first pre-selected operating depth.

3. The agricultural implement of claim 2, wherein at least one of the first sensor and the second sensor is a hall effect rotational sensor.

4. The agricultural implement of claim 2, wherein at least one of the first sensor and the second sensor is a pressure transducer.

5. The agricultural implement of claim 1, wherein at least one of the first ground-engaging tool and the second ground-engaging tool is a shank.

6. The agricultural implement of claim 1, wherein at least one of the first ground-engaging tool and the second ground-engaging tool is a disk.

7. The agricultural implement of claim 1, wherein the second pre-selected operating depth is independent of the first pre-selected operating depth.

8. An agricultural implement adapted to be moved by a vehicle in a forward direction of travel, the agricultural implement comprising:
a first frame section;
a first ground-engaging tool coupled to the first frame section and configured to operate at a first pre-selected operating depth;
a second frame section coupled to the first frame section forward of the first ground-engaging tool, wherein positioning of the second frame section is dependent upon positioning of the first frame section;
a second ground-engaging tool coupled to the second frame section;
an electro-hydraulic controller configured to receive a source of hydraulic pressure;
a first extendable and retractable cylinder in fluid communication with the electro-hydraulic controller and coupled to the first frame section and the second frame section, the first extendable and retractable cylinder configured to move the second ground-engaging tool between a second ground-engaging tool transport position and a second pre-selected operating depth;
a third frame section coupled to the first frame section rearward of the first ground-engaging tool, wherein positioning of the third frame section is dependent upon positioning of the first frame section;
a third ground-engaging tool coupled to the third frame section;
a second extendable and retractable cylinder in fluid communication with the electro-hydraulic controller and coupled to the first frame section and the third frame section, the second extendable and retractable cylinder configured to move the third ground-engaging tool between a third ground-engaging tool transport position and a third pre-selected operating depth; and
a depth control device having at least one sensor configured to sense an operating depth of the second ground-engaging tool, the at least one sensor being operatively coupled to the electro-hydraulic controller, wherein the electro-hydraulic controller receives from the depth control device an input signal based on a signal from the at least one sensor and controls at least one of the lift device and the first extendable and retractable cylinder to compensate for movement of the first frame section as needed to maintain the second ground-engaging tool substantially at the second pre-selected operating depth.

9. The agricultural implement of claim 8, wherein the depth control device has two or more sensors including a sensor configured to sense an operating depth of the third ground-engaging tool and being operatively coupled to the electro-hydraulic controller which controls the second extendable and retractable cylinder to maintain the third ground-engaging tool substantially at the third pre-selected operating depth.

10. The agricultural implement of claim 9, wherein at least one of the first sensor, the second sensor, and the third sensor is a hall effect rotational sensor.

11. The agricultural implement of claim 9, wherein at least one of the first sensor, the second sensor, and the third sensor is a pressure transducer.

12. The agricultural implement of claim 8, wherein at least one of the first ground-engaging tool, the second ground-engaging tool, and the third ground-engaging tool is a shank.

13. The agricultural implement of claim 8, wherein at least one of the first ground-engaging tool, the second ground-engaging tool, and the third ground-engaging tool is a disk.

14. The agricultural implement of claim 8, wherein the second pre-selected operating depth and the third pre-selected operating depth are independent of the first pre-selected operating depth.

15. An agricultural implement adapted to be moved by a vehicle in a forward direction of travel, the agricultural implement comprising:
a first frame section;
a first ground-engaging tool coupled to the first frame section;
an electronic controller configured to receive a source of electric power;
a lift device in communication with the electronic controller and coupled to the first frame section, the lift device configured for raising and lowering the first frame section with respect to the ground to move the first ground-engaging tool between a first ground-engaging tool transport position and a first pre-selected operating depth;
a second frame section coupled to the first frame section forward of the first ground-engaging tool, wherein positioning of the second frame section is dependent upon positioning of the first frame section;
a second ground-engaging tool coupled to the second frame section;
an electronic actuator in communication with the electronic controller and coupled to the first frame section and the second frame section, the electronic actuator configured to move the second ground-engaging tool between a second ground-engaging tool transport position and a second pre-selected operating depth; and
a depth control device having at least one sensor configured to sense an operating depth of the second ground-engaging tool, the at least one sensor being operatively coupled to the electronic controller, wherein the electronic controller receives from the depth control device an input signal based on a signal from the at least one sensor and controls at least one of the lift device and the electronic actuator to compensate for movement of the first frame section as needed to maintain the second ground-engaging tool substantially at the second pre-selected depth.

16. The agricultural implement of claim 15, wherein the depth control device has two or more sensors including a first sensor configured to sense an operating depth of the first ground-engaging tool and being operatively coupled to the electro-hydraulic controller which controls the lift device to maintain the first ground-engaging tool substantially at the first pre-selected depth.

17. The agricultural implement of claim 15, wherein at least one of the first sensor and the second sensor is a hall effect rotational sensor.

18. The agricultural implement of claim 15, wherein at least one of the first sensor and the second sensor is a pressure transducer.

19. The agricultural implement of claim 15, wherein at least one of the first ground-engaging tool and the second ground-engaging tool is a disk.

20. The agricultural implement of claim 15, wherein the second pre-selected operating depth is independent of the first pre-selected operating depth.

\* \* \* \* \*